W. NELSON.
TRAP.
APPLICATION FILED MAY 20, 1916.
1,192,098.
Patented July 25, 1916.
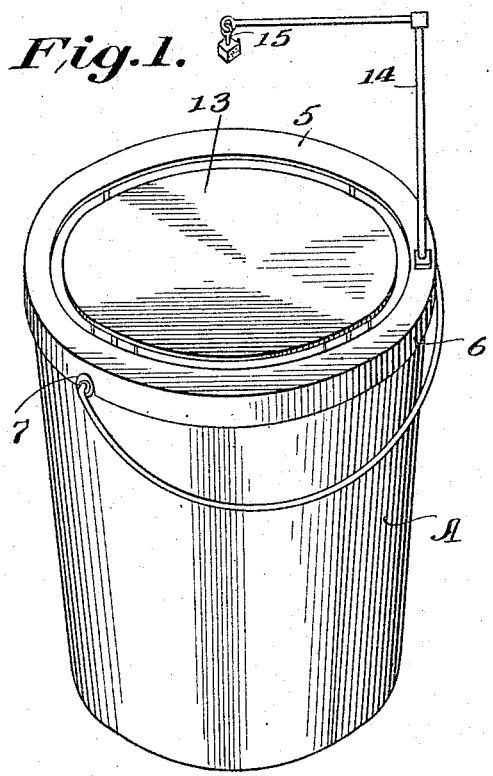
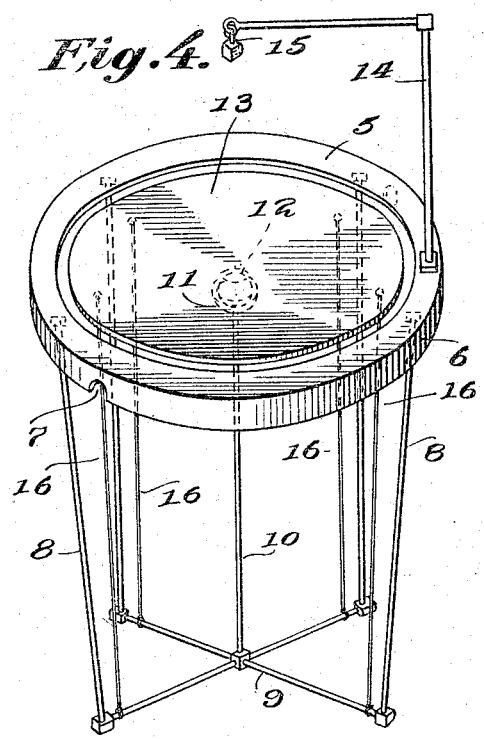
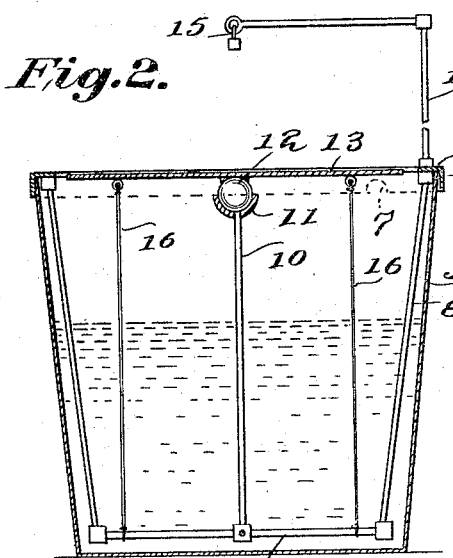
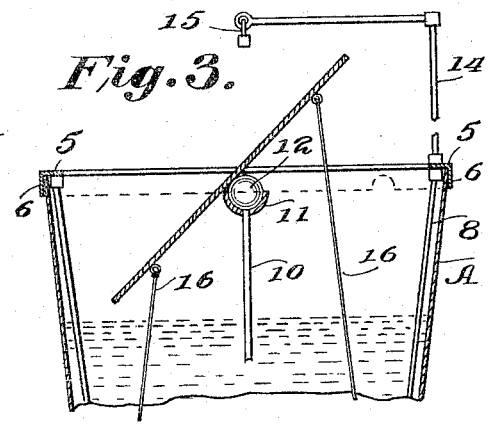
Inventor
Walter Nelson
By Victor J. Evans
Attorney

UNITED STATES PATENT OFFICE.

WALTER NELSON, OF NEW YORK, N. Y.

TRAP.

1,192,098.  Specification of Letters Patent.  Patented July 25, 1916.

Application filed May 20, 1916. Serial No. 98,842.

*To all whom it may concern:*

Be it known that I, WALTER NELSON, a citizen of the United States, residing at New York, in the county of New York and State of New York, have invented new and useful Improvements in Traps, of which the following is a specification.

The invention relates to traps, and more particularly to the class of rat traps.

The primary object of the invention is the provision of a trap of this character wherein the same can be mounted upon a pail, bucket or other like liquid container or receptacle so that the rat, when attracted by the bait, will be precipitated into the contents of the receptacle for the drowning of the same, thereby exterminating such pests.

Another object of the invention is the provision of a trap of this character which is novel in form and is adaptable for mounting upon a receptacle so that by partially filling the latter the animal can be delivered thereto from the trap for the drowning of the same.

A further object of the invention is the provision of a trap of this character which is extremely simple in construction, thoroughly reliable and efficient in operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which is indicated in the appended claims.

In the accompanying drawings: Figure 1 is a perspective view of a receptacle showing the trap constructed in accordance with the invention applied; Fig. 2 is a vertical longitudinal sectional view; Fig. 3 is a fragmentary vertical longitudinal sectional view showing the platform tilted; and Fig. 4 is a perspective view of the trap removed from the receptacle.

Similar reference characters indicate corresponding parts throughout the several views of the drawings.

Referring to the drawing in detail, A designates a pail which is of any ordinary well known construction and upon which is adapted to be placed the trap hereinafter fully described. The trap comprises a ring 5 preferably made from metal and having at its outer peripheral edge a depending annular flange 6 which is adapted to telescope over the mouth edge of the pail A for the securing of the ring 5 thereon, the flange 6 being formed at diametrically opposite points with notches 7 to provide a clearance for the bail or handle of the pail A so that said ring 5 can be firmly mounted upon the pail.

Fixed to and depending at equal distances apart from the ring 5 are supports 8, to the lower ends of which is fixed a cross arm spider 9 having rising centrally therefrom a vertical stem or upright 10 formed at its upper end with a semispherical head 11 providing a ball seat for accommodating a spherical object forming a ball fulcrum 12, to which is fixed a tilting platform 13, the same being normally flush with the upper face of the ring 5 and serves as a tread for the rat when attracted by a bait supported in a manner presently described.

Fixed to and rising from the ring 5 is an L-shaped hanger or bait holder 14. On the free end of the horizontal portion of said hanger 14 is a hook 15 or the like for the attachment of a bait thereto, the latter being designed to hang centrally over the platform 13 at the desired elevation above the same for attracting a rat thereto, yet being out of reach of the same when treading upon the platform.

Connected to the platform 13 at four points thereof, concentrically of the same, are elastic members 16, the same being also connected to the arms of the spider 9 concentrically of its center, and these elastic members serve to tension the platform 13 and normally hold the same in a plane with the upper face of the ring 5. It will be noted that when the rat is precipitated on the tilting of the platform 13 into the pail the members automatically swing the platform to normal position, thereby closing the pail.

When the trap is mounted upon the pail A the supports 8 depend interiorly of the same, with the cross spider 9 a suitable depth within water contained in the pail or submerged a sufficient distance so that the rat, when precipitated within the water, cannot stand thereon to evade drowning. When the rat is attracted by the bait 15 it treads upon the platform 13 which rocks on its fulcrum 12, thus dropping the rat into the pail and the water therein causes the same to drown. The platform 13 is of a size corresponding to the center opening of the ring 13 to occupy the same.

From the foregoing description, taken in connection with the accompanying drawing, the construction and operation of the herein described trap will be readily apparent and, therefore, a more extended explanation has been omitted.

Having thus described my invention, I claim:

A trap comprising a ring having a marginal flange adapted for detachable telescopic engagement with the mouth edge of a receptacle, a frame depending from said ring, a standard rising centrally from the frame and having a fulcrum head, a spherical member seated in said fulcrum head, a platform centrally fixed to the fulcrum member, means for sustaining a bait over the platform, and means connected at a plurality of points with the platform and the frame to tension said platform and normally hold the same in a plane with the ring.

In testimony whereof I affix my signature.

WALTER NELSON.

Witness:
JULIUS TRATTNER.

Copies of this patent may be obtained for five cents each, by addressing the "Commissioner of Patents, Washington, D. C."